US009628522B2

United States Patent
Gammill et al.

(10) Patent No.: US 9,628,522 B2
(45) Date of Patent: *Apr. 18, 2017

(54) ENHANCED CONTENT CONSUMPTION

(71) Applicant: Microsoft Technology Licensing, LLC, Redmond, WA (US)

(72) Inventors: Kevin Gammill, Beaux Arts, WA (US); Stacey Law, Redmond, WA (US); Jeff Tucker, Redmond, WA (US); Sean Kollenkark, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,558

(22) Filed: May 27, 2016

(65) Prior Publication Data

US 2016/0277452 A1  Sep. 22, 2016

Related U.S. Application Data

(63) Continuation of application No. 14/550,582, filed on Nov. 21, 2014, now Pat. No. 9,357,015, which is a
(Continued)

(51) Int. Cl.
  *H04L 29/06* (2006.01)
  *G06Q 50/10* (2012.01)
  *H04L 29/08* (2006.01)

(52) U.S. Cl.
  CPC ........ *H04L 65/1069* (2013.01); *G06Q 50/10* (2013.01); *H04L 67/141* (2013.01)

(58) Field of Classification Search
  None
  See application file for complete search history.

(56) References Cited

U.S. PATENT DOCUMENTS

| | | | |
|---|---|---|---|
| 7,035,897 B1* | 4/2006 | Devereaux | H04L 67/04 348/211.99 |
| 7,292,588 B2* | 11/2007 | Milley | H04M 1/7253 345/2.3 |

(Continued)

FOREIGN PATENT DOCUMENTS

| | | |
|---|---|---|
| CN | 1363184 A | 8/2002 |
| CN | 1628450 A | 6/2005 |
| CN | 1798019 A | 7/2006 |

OTHER PUBLICATIONS

"Sony Ericsson Introduces Bluetooth Auto-Pairing Devices," Mobiledia Website, Retrieved Online at www.mobiledia.com/news/37112.html, Sep. 28, 2005, 3 pages.

(Continued)

*Primary Examiner* — Peling Shaw
(74) *Attorney, Agent, or Firm* — Alleman Hall McCoy Russell & Tuttle LLP

(57) ABSTRACT

Enhanced content consumption is provided by establishing a pairing between two computing devices, wherein at least one of the two computing devices provides a primary consumption experience of a digital content item, so that a secondary consumption experience can be provided via operation of at least one of the two computing devices. The method further comprises presenting, using at least one of the two computing devices, the digital content item for consumption by a user. The method further comprises performing one or more supplemental consumption functions with the other of the two computing devices.

20 Claims, 4 Drawing Sheets

Related U.S. Application Data continuation of application No. 12/969,148, filed on Dec. 15, 2010, now Pat. No. 8,898,310.

(56) References Cited

U.S. PATENT DOCUMENTS

| | | | | |
|---|---|---|---|---|
| 7,519,658 | B1* | 4/2009 | Anglin | G06F 15/16 709/203 |
| 2002/0091797 | A1* | 7/2002 | Wallenius | H04Q 3/0033 709/218 |
| 2002/0194501 | A1* | 12/2002 | Wenocur | G06Q 10/107 726/4 |
| 2003/0041110 | A1* | 2/2003 | Wenocur | G06Q 10/107 709/206 |
| 2004/0203797 | A1 | 10/2004 | Burr | |
| 2004/0226041 | A1* | 11/2004 | Smith | G06F 3/038 725/43 |
| 2005/0010417 | A1 | 1/2005 | Holmes | |
| 2005/0091408 | A1* | 4/2005 | Parupudi | G06F 17/3087 709/246 |
| 2006/0123081 | A1* | 6/2006 | Baudino | G06Q 30/02 709/204 |
| 2006/0232604 | A1* | 10/2006 | Toyoda | G11B 27/34 345/619 |
| 2006/0281409 | A1 | 12/2006 | Levien et al. | |
| 2007/0274233 | A1* | 11/2007 | Ptashek | H04L 67/16 370/254 |
| 2009/0034591 | A1 | 2/2009 | Julian et al. | |
| 2009/0240814 | A1 | 9/2009 | Brubacher et al. | |
| 2009/0319673 | A1 | 12/2009 | Peters | |
| 2010/0125735 | A1* | 5/2010 | Zapata | G06F 8/65 713/170 |
| 2011/0119393 | A1* | 5/2011 | Kim | H04L 67/1095 709/231 |

OTHER PUBLICATIONS

Swedlow, T. et al., "The iTV Doctor Is In!: Using the Smartphone as a TV Companion Device," Interactive TV Today (ITVT) Website, Available Online at http://itvt.com/itv_doctor/6901/itv-doctor-using-smartphone-tv-companion-device, Jun. 10, 2010, 3 pages.

United States Patent and Trademark Office, Office Action Issued in U.S. Appl. No. 12/969,148, Jun. 8, 2012, 10 pages.

United States Patent and Trademark Office, Office Action Issued in U.S. Appl. No. 12/969,148, Sep. 11, 2013, 12 pages.

State Intellectual Property Office of the People's Republic of China, Office Action Issued in Application No. 201110443222.7, Jul. 1, 2014, 11 pages.

United States Patent and Trademark Office, Notice of Allowance Issued in U.S. Appl. No. 12/969,148, Jul. 30, 2014, 18 pages.

State Intellectual Property Office of the People's Republic of China, Office Action Issued in Application No. 201110443222.7, Feb. 4, 2015, 8 pages.

United States Patent and Trademark Office, Office Action Issued in U.S. Appl. No. 14/550,582, May 20, 2015, 16 pages.

State Intellectual Property Office of the People's Republic of China, Office Action Issued in Application No. 201110443222.7, Jun. 3, 2015, 8 pages.

United States Patent and Trademark Office, Office Action Issued in U.S. Appl. No. 14/550,582, Nov. 4, 2015, 12 pages.

State Intellectual Property Office of the People's Republic of China, Office Action Issued in Application No. 201110443222.7, Nov. 27, 2015, 10 pages.

United States Patent and Trademark Office, Notice of Allowance Issued in U.S. Appl. No. 14/550,582, Feb. 3, 2016, 22 pages.

State Intellectual Property Office of the People's Republic of China, Office Action Issued in Application No. 201110443222.7, May 13, 2016, 8 pages. (Submitted with Partial Translation).

* cited by examiner

ENHANCED CONTENT CONSUMPTION

CROSS REFERENCE TO RELATED APPLICATIONS

This application is a continuation of U.S. patent application Ser. No. 14/550,582, filed Nov. 21, 2014, now U.S. Pat. No. 9,357,015, which is a continuation of U.S. patent application Ser. No. 12/969,148, filed on Dec. 15, 2010, now U.S. Pat. No. 8,898,310, entitled "ENHANCED CONTENT CONSUMPTION", the entire disclosures of each of which are hereby incorporated herein by reference.

BACKGROUND

A consumption experience for content such as music, video, movies, television, applications, games, etc. may be provided by a suitable computing device such as a television, personal computer, laptop, media player, mobile device, etc. It is not uncommon for a user to have more than one such device, and in some cases, two or more of the devices may be paired with one another. Further, in some consumption content scenarios, a consumption experience may have an additional supplemental experience that is related to the primary consumption experience. However, the device pairing and supplemental experience functionalities are typically separate.

SUMMARY

According to one aspect of this disclosure, a method of enhancing consumption of digital content items using two or more computing devices is provided. The method comprises establishing a pairing between two computing devices, wherein at least one of the two computing devices provides a primary consumption experience of a digital content item, so that a secondary consumption experience can be provided via operation of at least one of the two computing devices. The method further comprises presenting, using at least one of the two computing devices, the digital content item for consumption by a user. The method further comprises performing one or more supplemental consumption functions with the other of the two computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

It is becoming increasingly common for a user to have more than one computing device for content consumption. However, traditionally, content consumption across multiple screens may either not be provided within traditional content consumption scenarios, or may be substantially ad-hoc. Therefore, it is desirable to provide a multi-screen consumption experience which enhances the overall user experience for the user.

Therefore, embodiments are disclosed herein that relate to enhanced content consumption, wherein content consumption is enhanced within an environment of two or more paired computing devices by providing a secondary consumption experience which enhances a primary consumption experience of a digital content item. Such secondary consumption experiences may include, for example, interactive supporting experiences which extend the primary consumption experience for the user and/or may not detriment the primary viewing experience for others. Further, the pairing allows for a level of fidelity of the secondary consumption experience to be determined based on capabilities learned during pairing, in some embodiments.

Figure 1:
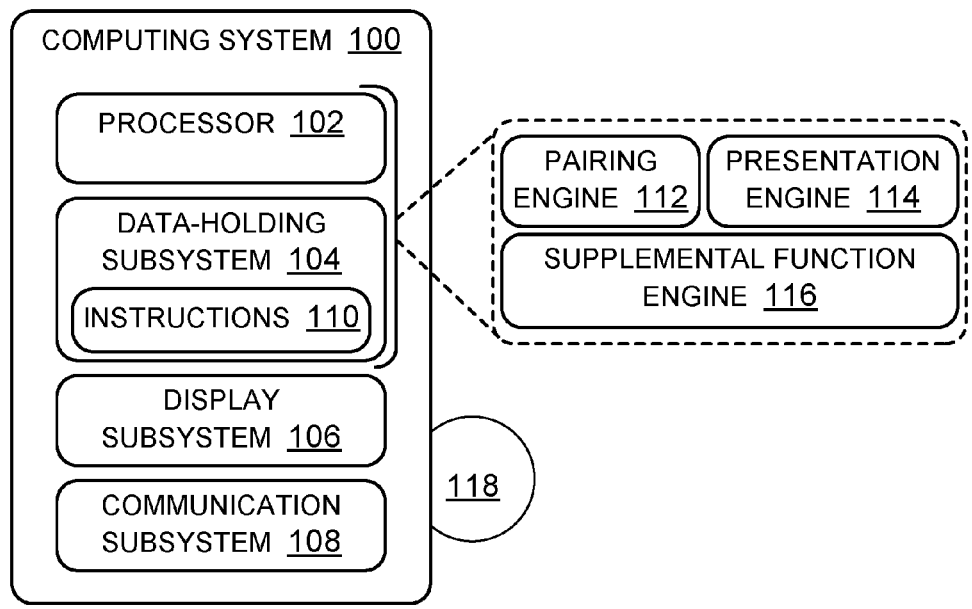
FIG. 1 shows an example computing system in accordance with an embodiment of the present disclosure.

FIG. 1 shows an example computing system 100 for enhancing consumption of digital content items. Computing system 100 may be a computing device such as a television, personal computer, laptop, media player, mobile device, gaming device/console, etc. that is configured to consume content such as music, video, movies, television, applications, games, etc.

Computing system 100 is shown in simplified form. It is to be understood that virtually any computer architecture may be used without departing from the scope of this disclosure. In different embodiments, computing system 100 may take the form of a mainframe computer, server computer, desktop computer, laptop computer, tablet computer, home entertainment computer, network computing device, mobile computing device, mobile communication device, gaming device, etc. Further, computing system 100 may include one or more computing devices and/or server devices communicatively coupled with one another.

Computing system 100 includes a processor 102 and a data-holding subsystem 104. Computing system 100 may optionally include a display subsystem 106, communication subsystem 108, and/or other components not shown in FIG. 1. Computing system 100 may also optionally include user input devices such as keyboards, mice, game controllers, cameras, microphones, and/or touch screens or other haptic devices, for example.

Computing system 100 may be configured to enhance content consumption in any suitable way, such as by executing instructions. As such, computing system 100 further includes a processor 102 which may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Data-holding subsystem 104 may include one or more physical, non-transitory, devices configured to hold data and/or instructions executable by the processor to implement the herein described methods and processes. When such methods and processes are implemented, the state of data-holding subsystem 104 may be transformed (e.g., to hold different data).

Data-holding subsystem 104 may include removable media and/or built-in devices. Data-holding subsystem 104 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 104 may include devices with one or more of the following characteristics: volatile, nonvolatile, dynamic, static, read/write, read-only, random access, sequential access, location addressable, file addressable, and content addressable. In some embodiments, processor 102 and data-holding subsystem 104 may be integrated into one or more common devices, such as an application specific integrated circuit or a system on a chip.

As a nonlimiting example, data-holding subsystem 104 may hold instructions 110 executable by processor 102 for enhancing consumption of digital content items. As such, computing system 100 is configured to establish a pairing between two or more computing devices. In such a case, at least one of the computing devices provides a primary consumption experience of a digital content item. By establishing such a pairing, at least one of the two computing devices may learn capabilities of the other of the two computing devices, so that a secondary consumption experience can be provided (e.g., via operation of at least one of the devices). In some embodiments, computing system 100 may be configured to establish such a pairing via a pairing engine 112. As described in more detail below, in some embodiments a pairing may be established via a proxy server running on the Internet. As such, a service running in the cloud may know the capabilities of the two devices, but each of the two devices may not be aware of the other's capabilities. It is to be appreciated that a "service", as used herein, may be an application program executable across multiple user sessions and available to one or more system components, programs, and/or other services. In some implementations, a service may run on a server responsive to a request from a client.

In the case that computing system 100 represents a computing device providing a primary consumption experience, computing system 100 may establish pairing with another computing device (e.g., a companion computing device). However, in the case that computing system 100 represents a companion device, computing system 100 may establish pairing with the device providing the primary consumption experience. As yet another example, computing system 100 may be an entertainment system facilitating the pairing between two other computing devices.

By establishing the pairing, at least one of the two computing devices learns capabilities of the other of the two computing devices, in some embodiments. It should be appreciated that such learning is nonlimiting. For example, in some embodiments, one of the computing devices may simply send commands to the other computing device, and the other computing device may choose to display or ignore the commands based on its capabilities. Further yet, in some embodiments, such learning may include a two-way communication wherein each device learns the capabilities of the other device. Such an intelligent pairing allows for a secondary consumption experience to then be provided via operation of at least one of the computing devices. As described in more detail herein, such secondary consumption experiences may enhance the primary consumption experience in any of a variety of possible ways, such as by providing content and/or features (e.g., context-specific displays, commands, etc.) at a companion device paired to the device providing the primary consumption experience. Further, in some embodiments, the pairing may be turned off by one or more of the computing devices.

For example, input control may be provided at the companion device for controlling aspects of the primary consumption experience. As another example, the companion device may have the capability to act as a master, and may take over control of the primary experience and/or other computing device(s). As yet another example, a deeper/richer experience may be provided at the companion device which "lights up" the primary consumption experience (e.g., by providing director's cut information, relevant information/trivia, a time-synchronized party-chat mode, etc.). As yet another example, interactions that may otherwise interfere with the primary consumption experience may be offloaded to the companion device, so as to enhance the user experience. As yet another example, two users may consume the same primary experience together, but may each have a different secondary experience on a companion device which is contextually relevant to them. It should be appreciated that these examples are illustrative and not intended to be limiting in any way.

It should also be appreciated that as used herein, the term "companion device" is used to describe at a computing device intelligently paired to another computing device which is providing a primary consumption experience, and such a companion device may provide the secondary consumption experience. However, if the capabilities of the companion device are sufficient to provide the primary consumption experience, then the companion device may additionally or alternatively provide the primary consumption experience.

Continuing with FIG. 1, computing system 100 is further configured to present the digital content item for consumption by a user (e.g., via presentation engine 114). For the case that computing system 100 represents one of the two computing devices, then presenting the digital content item may include presenting the digital content item on a display of computing system 100 or another display communicatively coupled with computing system 100. In some embodiments, a display subsystem 106 may be used to present a visual representation of data held by data-holding subsystem 104. As the herein described methods and processes change the data held by the data-holding subsystem, and thus transform the state of the data-holding subsystem, the state of display subsystem 106 may likewise be transformed to visually represent changes in the underlying data. Display subsystem 106 may include one or more display devices utilizing virtually any type of technology. Such display devices may be combined with processor 102 and/or data-holding subsystem 104 in a shared enclosure, or such display devices may be peripheral display devices.

However, for the case that computing system 100 represents an entertainment system facilitating such presentation, computing system 100 may present the digital content item to one of the two computing devices for display using one of the two computing devices.

Computing system 100 is further configured to perform one or more supplemental consumption functions with the other of the two computing devices (e.g., via a supplemental consumption function engine 116). The supplemental consumption function(s) are then implemented based on capabilities that have been learned during the pairing of the two computing devices. Performing the supplemental consumption function may establish, for example, a secondary consumption experience at a companion device.

As a nonlimiting example, a companion device may report its capabilities to the device providing the primary consumption experience, and the device providing the primary consumption experience may then send a secondary consumption experience having an appropriate level of fidelity to the companion device. However, for the case of computing system 100 being an entertainment system associated with system-level events, the system may provide the secondary consumption experience having an appropriate level of fidelity to the companion device. Performing the supplemental consumption function is described in greater detail below with reference to FIG. 2.

It should be appreciated that the terms "module," "program," and "engine" may be used to describe an aspect of computing system 100 that is implemented to perform one or more particular functions. In some cases, such a module, program, or engine may be instantiated via processor 102 executing instructions held by data-holding subsystem 104. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

FIG. 1 also shows an aspect of the data-holding subsystem in the form of removable computer-readable storage media 118, which may be used to store and/or transfer data and/or instructions executable to implement the herein described methods and processes. Removable computer-readable storage media 118 may take the form of CDs, DVDs, HD-DVDs, Blu-Ray Discs, EEPROMs, and/or floppy disks, among others.

When included, communication subsystem 108 may be configured to communicatively couple computing system 100 with one or more other computing devices. Such a subsystem may, for example, aid in establishing the pairing between two or more devices and/or facilitate subsequent sending/receiving of information. Communication subsystem 108 may include wired and/or wireless communication devices compatible with one or more different communication protocols, either directly or through a proxy server, for example. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 100 to send and/or receive messages to and/or from other devices via a network such as the Internet.

Figure 2:
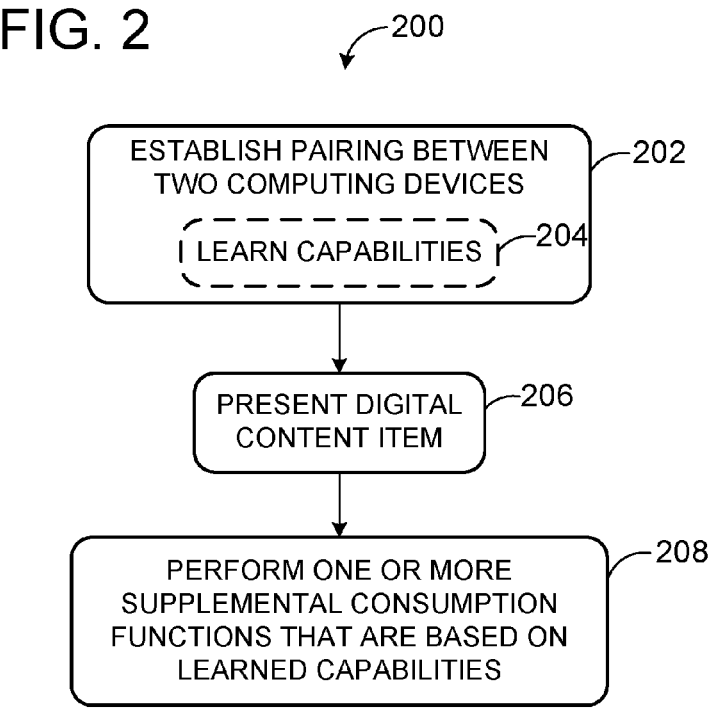
FIG. 2 shows a flow diagram of an example method of enhancing consumption of digital content.

Turning now to FIG. 2, FIG. 2 illustrates an example method 200 of enhancing consumption of digital content items using two or more computing devices. Such a method may be tied to a computing system including one or more computers, such as computing system 100 of FIG. 1. Further, such a method may be implemented as a computer application, computer service, computer API, computer library, and/or other computer program product.

At operation 202, method 200 comprises establishing a pairing between at least two computing devices, wherein at least one of the two computing devices provides a primary consumption experience of a digital content item. It should be appreciated that the two computing devices may be any suitable devices configured to consume content. In some embodiments, at least one of the two computing devices may be a portable computing device (e.g., a mobile communication device, a tablet computer, a laptop computer, a portable media player, etc.).

The pairing may be established in any suitable manner. In some embodiments, a peer-to-peer pairing may be established directly between the two computing devices. However, in some cases, a network may be utilized to establish the pairing. The two computing devices may then remain paired via the network connection. However, in other cases, the network may be utilized to facilitate communication between the two devices and establish a peer-to-peer pairing, such that upon being paired, the two computing devices are directly paired with one another.

By establishing the pairing, at least one of the two computing devices learns capabilities of the other of the two computing devices, as indicated at operation 204. In some embodiments, one computing device may query the other computing device for its capabilities. However, in other embodiments, a computing device may provide its capabilities to the other device without being queried. The capabilities may be reported over any suitable communication protocol, such as the Internet, Bluetooth, etc. It should be appreciated that such learning is nonlimiting. In some embodiments, one of the computing devices may simply send commands to the other computing device, and the other computing device may choose to display or ignore the commands based on its capabilities. As such, a computing device need not "micro-manage" the actions of the other computing device.

The capabilities learned during intelligent pairing may include device capabilities such as processing capability, data storage capability, display capability, etc. However, in some embodiments, the capabilities may include capabilities of interaction, such as bandwidth, network availability, etc.

The capabilities are learned so that a secondary consumption experience can be provided via operation of at least one of the computing devices. Such a secondary consumption experience may be, for example, a companion experience to the primary consumption experience. The capabilities learned during the pairing may indicate a level of fidelity (e.g., an audio and/or video quality, etc.) for the secondary consumption experience.

Continuing with FIG. 2, operation 206 includes presenting, using at least one of the two computing devices, the digital content item for consumption by a user. In some embodiments, such presentation of the digital content item may be included within the primary consumption experience, for example.

At 208, method 200 includes performing a supplemental consumption function with the other of the two computing devices, wherein the supplemental consumption function is implemented based on capabilities that have been learned during the pairing of the two computing devices.

Performing the supplemental consumption function may, for example, establish the secondary consumption experience which is then provided via operation of at least one of the computing devices. As an example, a companion device, upon reporting its capabilities (e.g., to the computing device providing the primary consumption experience, to an entertainment system, etc.), may receive (e.g., from the computing device providing the primary consumption experience, from the entertainment system, etc.) a secondary consumption experience that is appropriate for the capabilities of the companion device. The secondary consumption experience may be received over any suitable communication protocol, such as the Internet, Bluetooth, etc. The secondary consumption experience may correspond to the primary consumption experience, and in some cases, may even be time-synchronized with the primary consumption experience.

As a nonlimiting example, the supplemental consumption function may be remote secondary control of one or more operations occurring in connection with the primary consumption experience. For example, the primary consumption experience may include presentation of the digital content item on a first computing device (e.g., a television), and the secondary consumption experience may include input control via a second computing device (e.g., a portable computing device). Learning capabilities for the second computing device during pairing ensures that the secondary consumption experience is configured appropriately for the second computing device. It should be appreciated that remote secondary control is not limited to traditional remote control operations such as channel and/or playback commands, volume commands, etc. and may include any suitable remote controlling operations including those aiding in content navigation and discovery. As an example, remote secondary control may include navigating menus, information, etc. on a secondary screen (e.g., to dive deeper into a topic and/or switch topics altogether). As such, the primary experience associated with the primary screen may remain uninterrupted.

As another nonlimiting example, the supplemental consumption function may include presentation of content or features. It should be appreciated that such content or features may be virtually any suitable content or features which enhance the primary consumption experience. In other words, such content or features may be in addition to, similar to, different than, etc. the content and/or features present in the primary consumption experience. Further, in some embodiments, the content or features may be a subset of the content and/or features present in the primary consumption experience, wherein the subset is configured based on the capabilities learned during pairing of the two computing devices. Accordingly, the supplemental consumption function may be an off-loading assumption of at least some functionality of the primary consumption experience to the other of the two computing devices.

Figure 3:
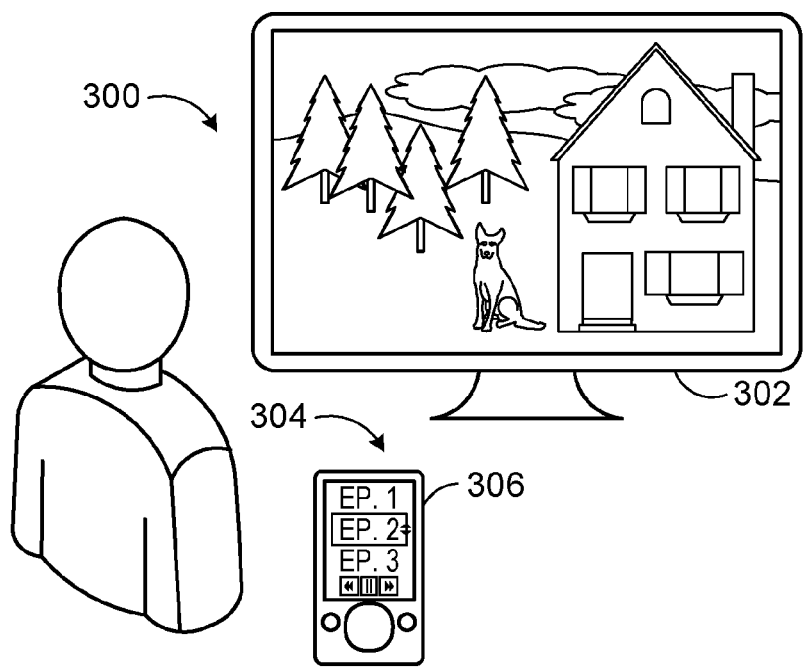
FIG. 3 shows an example use scenario in accordance with an embodiment of the present disclosure.

FIG. 3 shows an example use scenario wherein the supplemental consumption function is an off-loading assumption of provision of one or more input controls controlling presentation of the content item within the primary consumption experience. In this example, a first consumption experience 300 is provided via a first computing device 302, and a second consumption experience 304 is provided via a second computing device 306 which is paired with computing device 302. In this example, the second consumption experience includes remote control operation of aspects associated with the first consumption experience 300. During pairing, capabilities of second computing device 306 were learned such that second consumption experience 304 is configured for such capabilities. It should be appreciated that this example is nonlimiting, and input controls may be associated with any of a variety of input devices, such as a game controller, a keyboard, etc.

Figure 4:
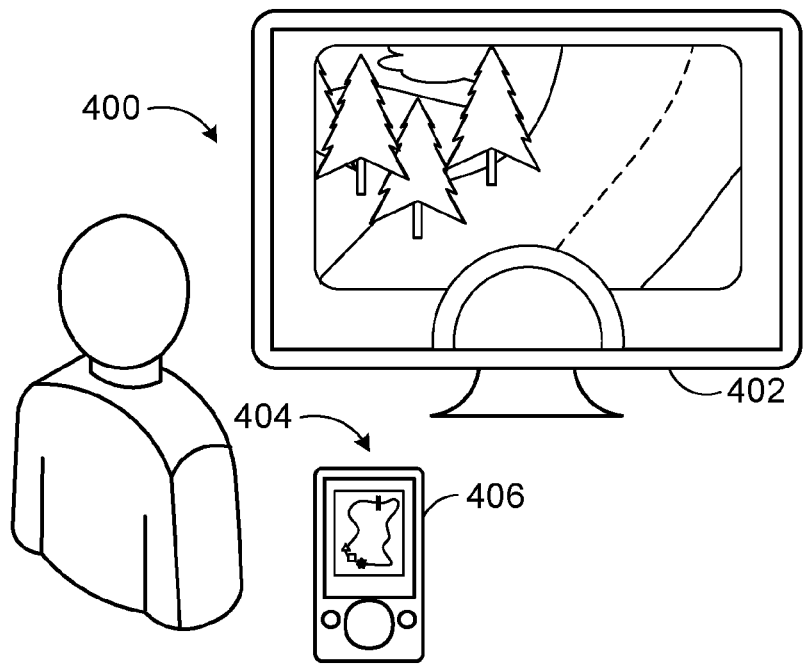
FIG. 4 shows another example use scenario in accordance with an embodiment of the present disclosure.

FIG. 4 illustrates another example, wherein a primary consumption experience 400 at a first computing device 402 includes a gaming experience. In this example, the supplemental consumption function is an off-loading assumption of presentation of a head-up display (HUD) associated with the game. As such, the HUD is presented within a secondary consumption experience 404 at a second computing device 406.

As yet other examples, the supplemental consumption function may be an off-loading assumption establishing an interactive chat mode at a companion device corresponding to presentation of the digital content item; another presentation of the content item (e.g., a "director's cut" version); a layered experience wherein additional information (layers) related to content is moved to the companion device; etc.

Further, in some cases, performing the supplemental consumption function may include presentation of content or features which otherwise interfere with the primary consumption experience if within the primary consumption experience. As such, the consumption experience is enhanced for the user in that these features are moved to another device so as not to interfere with the primary consumption experience.

It should be appreciated that scenarios having more than two computing devices are fully included within the scope of this disclosure. For example, a computing device providing a primary consumption experience may be paired to multiple companion devices each providing different companion experiences. As such, the user of companion device may participate in a different enhanced experience of the primary consumption experience. Further, these different companion experiences may be contextualized to the individual consuming the secondary experience along with the primary experience.

In should be further appreciated that, in some embodiments, the capabilities learned during the pairing may indicate a capability of providing the primary consumption experience at the other of the two devices. In other words, the companion device may be a full-featured laptop, mobile communication device, etc. capable of presenting the content item, for example. In such a case, performing the supplemental consumption function may include establishing presentation of the primary consumption experience at the other of the two computing devices. Thus, the primary consumption experience may be transferred from a computing device to a companion device.

Figure 5:
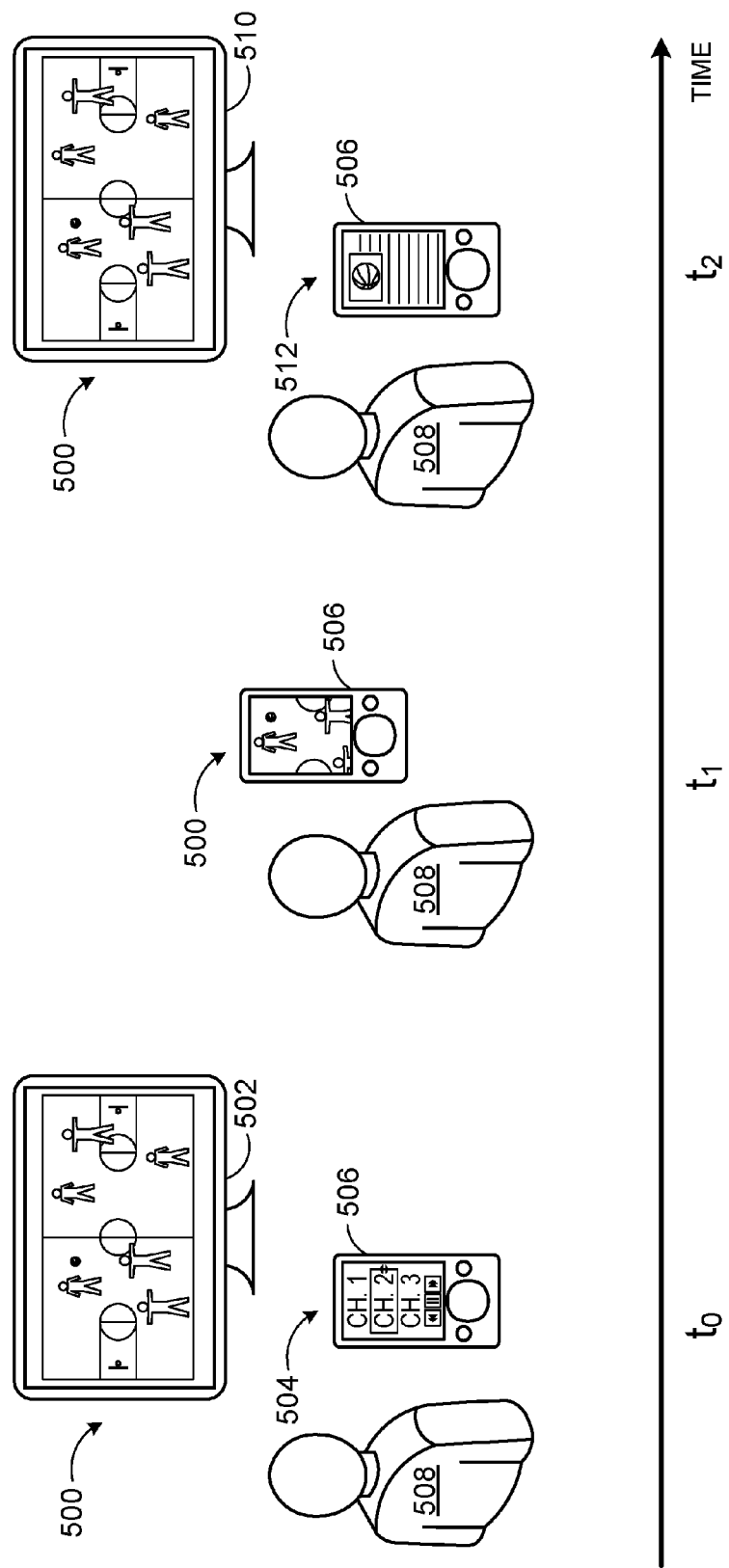
FIG. 5 shows a timeline of yet another example use scenario in accordance with an embodiment of the present disclosure.

FIG. 5 illustrates an example timeline of such a scenario, wherein at time t0, a primary consumption experience 500 of a basketball game is provided by a first computing device 502, and a secondary consumption experience 504 (e.g., remote control) is provided by a second computing device 506.

In this example, it was learned during pairing that second computing device 506 is capable of providing the primary consumption experience. Accordingly, at subsequent time ti, the primary consumption experience 500 is transferred to second computing device 506. As an example, user 508 may have left the room where first computing device 502 is located, and in response, primary consumption experience 500 is transferred to second computing device 506, allowing user 508 to continue with the primary consumption experience 500. In such a case, second computing device 506 acts as a master, and takes control of the primary consumption experience. Further, at time t2, the user may then enter yet another room with a third computing device 510, to which second computing device 506 pairs. The primary consumption experience 500 may then be transferred to third computing device 510 upon determining it has sufficient capabilities, and second computing device 506 may then provide a secondary consumption experience 512.

Figure 6:
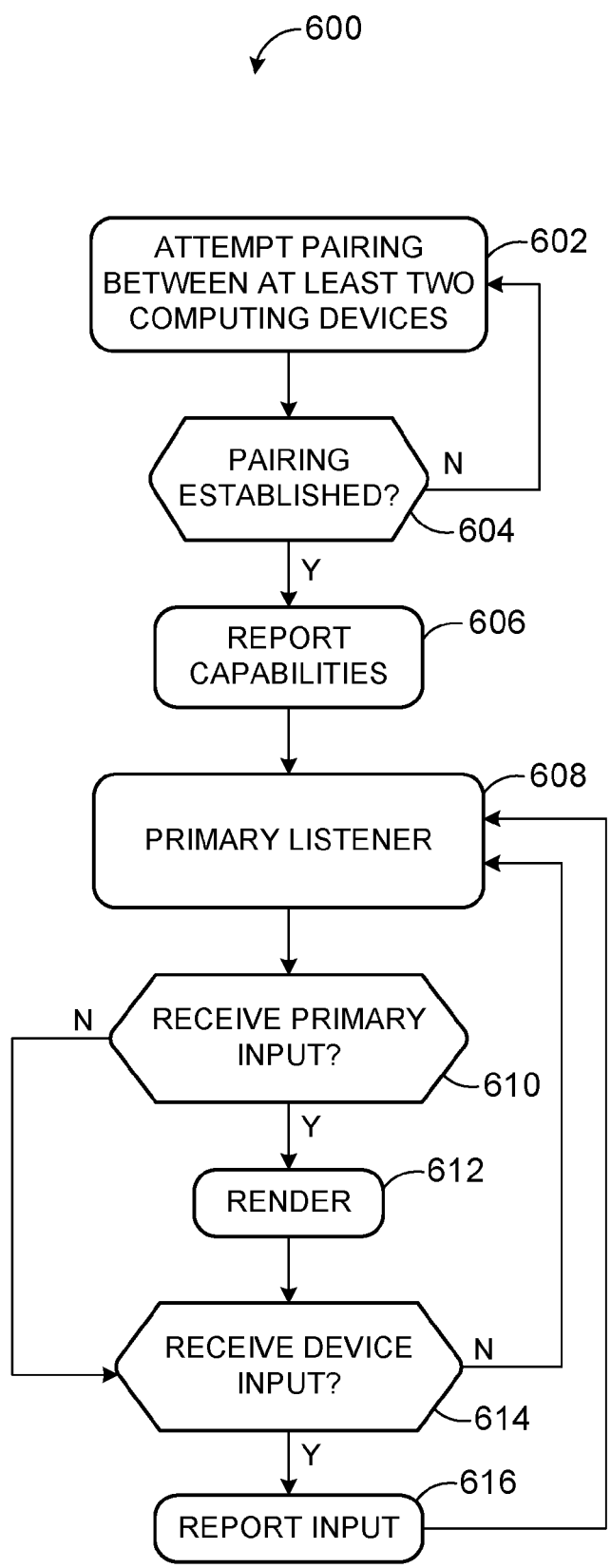
FIG. 6 shows a flow diagram of an example process flow in accordance with an embodiment of the present disclosure.

Turning now to FIG. 6, FIG. 6 illustrates an example process flow 600 for enhancing content consumption. At 602, pairing is attempted between at least two computing devices, one of which is providing a primary consumption experience of a digital content item. Flow then proceeds to 604, where it is determined whether or not pairing has been established. If not, flow returns to 602.

However, if pairing is established, then flow proceeds to 606, where capabilities of the other computing device are reported. As an example, a companion device may report its capabilities to a device providing the primary experience. Based on these capabilities, the device providing the primary experience may determine what level of experience (e.g., a level of fidelity of an experience) is appropriate for the companion device. The device providing the primary experience may share the primary consumption experience with the companion device (e.g., synchronously, if appropriate).

At 608, the device providing the primary experience listens for inputs. At 610, it is determined whether or not primary inputs are received at the primary listener. If so, flow proceeds to 612 where the inputs are rendered.

Upon rendering the inputs at 612, or alternatively it is determined at 610 that primary inputs are not received at the primary listener, flow proceeds to 614. At 614 it is determined whether device inputs are received at the other of the paired devices (e.g., a companion device). If it is determined that such device inputs are received, at 616 the inputs are reported (e.g., via a communication protocol) to the device providing the primary consumption experience, and flow returns to 608. However, if it is determined that such device inputs are not received, flow returns directly to 608.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A primary computing device, comprising:
   a processor; and
   a data holding subsystem holding instructions executable by the processor to instantiate a presentation engine configured to present, via a first display device, a primary video;
   the data holding subsystem further holding instructions executable by the processor to instantiate a supplemental function engine configured to present, via a first supplemental computer separate from the primary computing device and having different capabilities than the primary computing device, a first supplemental computing experience including layered information not present in the primary video that supplements the primary video;
   the supplemental function engine further configured to present, via a second supplemental computer separate from the primary computing device and having different capabilities than the primary computing device and the first supplemental computer, a second supplemental computing experience including layered information not present in the primary video that supplements the primary video, the second supplemental computing experience being different than the first supplemental computing experience.

2. The primary computing device of claim 1, wherein the first supplemental computing experience is implemented based on data storage capabilities of the first supplemental computer and the second supplemental computing experience is implemented based on different data storage capabilities of the second supplemental computer.

3. The primary computing device of claim 1, wherein the first supplemental computing experience is implemented based on display capabilities of the first supplemental computer and the second supplemental computing experience is implemented based on different display capabilities of the second supplemental computer.

4. The primary computing device of claim 1, wherein the first supplemental computing experience is implemented based on processing capabilities of the first supplemental computer and the second supplemental computing experience is implemented based on different processing capabilities of the second supplemental computer.

5. The primary computing device of claim 1, wherein the first supplemental computing experience is implemented based on network capabilities of the first supplemental computer and the second supplemental computing experience is implemented based on different network capabilities of the second supplemental computer.

6. The primary computing device of claim 1, wherein the first supplemental computing experience has a different level of fidelity than the second supplemental computing experience.

7. The primary computing device of claim 1, wherein the supplemental function engine is further configured to time-synchronize the first supplemental computing experience and the second supplemental computing experience to the primary video.

8. The primary computing device of claim 1, wherein the first supplemental computing experience includes one or more supplemental consumption functions.

9. The primary computing device of claim 8, wherein the second supplemental computing experience includes at least one of the one or more supplemental consumption functions.

10. The primary computing device of claim 8, wherein the one or more supplemental consumption functions include remote control of the primary video.

11. The primary computing device of claim 8, wherein the one or more supplemental consumption functions include provision of one or more input controls controlling presentation of the primary video.

12. The primary computing device of claim 8, wherein the one or more supplemental consumption functions include an interactive chat mode corresponding to the primary video.

13. The primary computing device of claim 8, wherein the one or more supplemental consumption functions include presentation of content or features in addition to those present in the primary video.

14. The primary computing device of claim 8, wherein the one or more supplemental consumption functions include presentation of content or features different from those present in the primary video.

15. The primary computing device of claim 1, further comprising a communication subsystem configured to establish a peer-to-peer pairing between the primary computing device and the first supplemental computer and between the primary computing device and the second supplemental computer.

16. The primary computing device of claim 1, further comprising a communication subsystem configured to establish a network connection between the primary computing device and the first supplemental computer and between the primary computing device and the second supplemental computer.

17. The primary computing device of claim 1, wherein the supplemental function engine is configured to simultaneously present the first supplemental computing experience and the second supplemental computing experience.

18. The primary computing device of claim 1, wherein the first supplemental computing experience is configured for presentation via a mobile communication device and the second supplemental computing experience is configured for presentation via a tablet computer.

19. A method of supplementing video content, comprising:
   on a supplemental computing device, recognizing playback of a primary video content item on a primary computing device other than the supplemental computing device; and
   on the supplemental computing device, time-synchronizing a supplemental computing experience to playback of the primary video content item on the primary computing device, the supplemental computing experience including layered information not present in the primary video content item that supplements time-synchronized information present in the primary video content.

20. A method, comprising:
   presenting, via a primary display, a primary video;
   presenting, via a first supplemental display separate from the primary display, a first supplemental computing experience including layered information not present in the primary video that supplements the primary video; and
   presenting, via a second supplemental display separate from the primary display and the first supplemental display, a second supplemental computing experience including layered information not present in the primary video that supplements the primary video, the second supplemental computing experience being different than the first supplemental computing experience.

* * * * *